(12) United States Patent
Taras et al.

(10) Patent No.: US 7,028,492 B2
(45) Date of Patent: Apr. 18, 2006

(54) HYBRID DEHUMIDICATION SYSTEM

(75) Inventors: Michael F. Taras, Fayetteville, NY (US); Alexander Lifson, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/790,350

(22) Filed: Mar. 1, 2004

(65) Prior Publication Data

US 2005/0166619 A1    Aug. 4, 2005

Related U.S. Application Data

(60) Provisional application No. 60/540,669, filed on Jan. 30, 2004.

(51) Int. Cl.
*F25B 29/00* (2006.01)
*F25B 49/00* (2006.01)
*F25D 17/04* (2006.01)

(52) U.S. Cl. .......................... 62/159; 62/173; 62/176.6; 62/196.4

(58) Field of Classification Search ............... 62/159, 62/173, 176.1, 176.6, 196.4
See application file for complete search history.

(56) References Cited

U.S. PATENT DOCUMENTS

| 5,404,729 | A | * | 4/1995 | Matsuoka et al. | ............ 62/179 |
| 5,706,664 | A | * | 1/1998 | Hara | ............ 62/159 |
| 6,843,312 | B1 | * | 1/2005 | Burk et al. | ............ 165/240 |

* cited by examiner

*Primary Examiner*—Marc Norman
(74) *Attorney, Agent, or Firm*—Bachman & LaPointe, PC

(57) ABSTRACT

A hybrid dehumidification system includes a compressor, a condenser, an expansion device and an evaporator connected for flow of working fluid through a fluid circuit; a reheat coil positioned relative to the evaporator for heating at least a portion of a stream of air passing through the evaporator; and a working fluid directing system adapted to flow working fluid in at least two modes of operation selected from the group consisting of a standard cooling mode, a cooling and enhanced dehumidification mode; a dehumidification without substantial sensible capacity mode; a heating and dehumidification mode; and a dehumidification with variable sensible capacity mode.

8 Claims, 3 Drawing Sheets

HYBRID DEHUMIDICATION SYSTEM

This application claims the benefit of Provisional Application No. 60/540,669, filed Jan. 30, 2004.

BACKGROUND OF THE INVENTION

The invention relates to a system which can provide heating, ventilation, air conditioning and refrigeration functions, as well as dehumidification, in a versatile and efficient manner.

Dehumidification is frequently needed in conditioned spaces using various heating, ventilation, air conditioning and refrigeration (HVAC & R) units or systems. This dehumidification can be desirable in both hot and cold environments. Conventional systems are limited in applicability of dehumidification function, and can be inefficient in certain circumstances.

The need exists for an improved system to provide dehumidification at different system conditions as needed, in an efficient manner.

It is therefore the primary object of the present invention to provide such a system.

It is a further object of the invention to provide a method for operating such a system.

Other objects and advantages of the present invention will appear hereinbelow.

SUMMARY OF THE INVENTION

In accordance with the present invention, the foregoing objects and advantages have been readily attained.

According to the invention, a hybrid dehumidification system is provided, which comprises: a compressor, a condenser, an expansion device and an evaporator connected for flow of working fluid through a circuit; a reheat coil positioned relative to the evaporator for heating at least a portion of a stream of air passing through the evaporator; and means for providing flow of working fluid in at least two modes of operation selected from the group consisting of:
- a cooling mode wherein working fluid flows sequentially from the compressor to the condenser, from the condenser to the expansion device, from the expansion device to the evaporator and from the evaporator to the compressor;
- a cooling and enhanced dehumidification mode wherein working fluid flows sequentially from the compressor to the condenser, from the condenser to the reheat coil, from the reheat coil to the expansion device, from the expansion device to the evaporator and from the evaporator to the compressor;
- a dehumidification without substantial sensible capacity mode wherein working fluid flows sequentially from the compressor to the reheat coil, from the reheat coil to the condenser, from the condenser to the expansion device, from the expansion device to the evaporator and from the evaporator to the compressor;
- a heating and dehumidification mode wherein working fluid flows sequentially from the compressor to the reheat coil, from the reheat coil to the expansion device, from the expansion device to the evaporator and from the evaporator to the compressor; and
- a dehumidification with variable sensible capacity mode wherein working fluid flows sequentially from the compressor in a first portion to the condenser and in a second portion around the condenser, the first and second portions then flow to the reheat coil, from the reheat coil to the expansion device, from the expansion device to the evaporator and from the evaporator to the compressor.

In further accordance with the invention, a method is provided for operating a system according to the invention so as to provide operation in a suitable fashion of a plurality of modes whereby cooling, heating and dehumidification are provided as needed.

BRIEF DESCRIPTION OF THE DRAWINGS

A detailed description of preferred embodiments of the invention follows, with reference to the attached drawings, wherein.

DETAILED DESCRIPTION

The invention relates to heating, ventilation, air conditioning and refrigeration systems and, more particularly, to such a system adapted to provide dehumidification in a plurality of different modes of operation adapted to various environmental conditions as well as sensible and latent capacity demands.

According to the invention, a refrigeration system is provided with additional flow segments and flow control valves along with a control unit adapted to operate same whereby a plurality of different modes of operation are available with the system. These different modes of operation make the system well suited for use in a wide variety of market requirements, and can respond to various needs in terms of latent and sensible capacity and environmental conditions.

Figure 1:
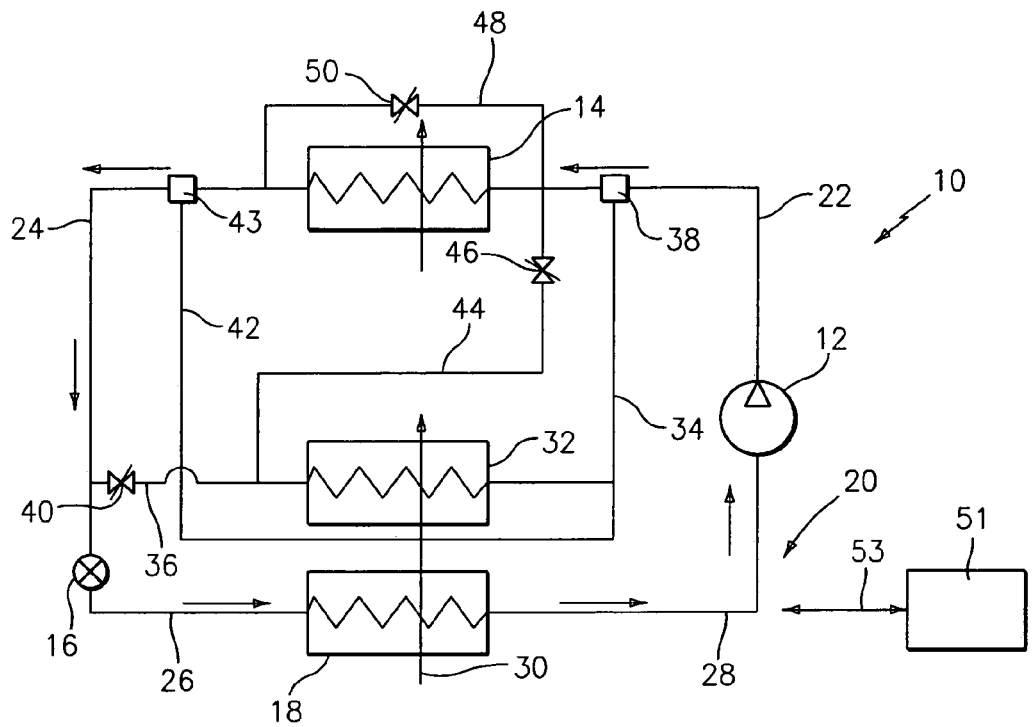
FIG. 1 schematically illustrates a system according to the invention, along with operation of the system in a mode of operation for providing cooling.

FIG. 1 illustrates a system 10 in accordance with the invention which includes a compressor 12, a condenser 14, expansion device 16 and evaporator 18, all connected by a working fluid circuit 20 including a segment 22 leading from compressor 12 to condenser 14, segment 24 leading from condenser 14 to expansion device 16, segment 26 leading from expansion device 16 to evaporator 18, and segment 28 leading from evaporator 16 back to compressor 12. This system works in well known fashion to condition an air stream 30 passed through evaporator 18, typically to cool, heat and/or dehumidify same.

Still referring to FIG. 1, system 10 also includes a reheat coil 32 which is positioned to condition at least a portion of stream 30. Reheat coil 32 can advantageously be used to reheat stream 30.

According to the invention, the components described above are connected by a series of additional flow segments and refrigerant flows through these components are controlled with flow control devices, such as valves, so as to provide a plurality of different desirable modes of operation. These modes include a conventional cooling mode, wherein no special means are applied to change the relationship between system latent and sensible performance, a cooling and enhanced dehumidification mode, a dehumidification with insignificant sensible capacity mode, a heating and dehumidification mode and a dehumidification with variable sensible capacity mode. Each of these modes of operation can be selected for operation based upon sensed conditions and/or user input directions so as to provide the desired function.

In the embodiment shown in the drawings, these additional flow segments and valve devices include a reheat segment including a segment 34 connected between line 22, upstream of condenser 14, and reheat coil 32, and a segment 36 connected between reheat coil 32 and line 24 downstream of condenser 14. A three-way valve 38 can be positioned at a junction between line 22 and segment 34 for controlling flow between same, and a shutoff valve 40 can be provided along line 36 as well.

A warm liquid reheat segment can also be provided as illustrated including a segment 42 leading from line 24 downstream of condenser to line 34 for feeding to reheat coil 32. According to the invention a three-way valve 43 can be positioned at a junction between line 24 and segment 42 for controlling flow between same.

A reheat working fluid recycle segment can also be provided including a segment 44 connected between segment 36 and line 22 for conveying reheat working fluid from reheat coil 32 back to an inlet of condenser 14. A shutoff valve 46 can be positioned along segment 44 for controlling flow therethrough.

Still further, a condenser bypass segment can be provided and include a segment 48 communicated between line 22 upstream of condenser 14 and line 24 downstream of condenser 14. A shutoff valve 50 can be positioned along segment 48 and used to control flow therethrough.

FIGS. 1–5 illustrate the system described above in 5 different modes of operation that can be called for depending upon requirements in accordance with the environmental conditions and latent and sensible capacity demands. These figures show valves in open/closed position and/or open in a particular direction as well as arrows showing flow of refrigerant in each mode.

FIG. 1 illustrates the system being operated in a conventional cooling mode, and shows open and closed valves for this mode as well as flow of working fluid. As shown, in this mode of operation three way-valve 38 is open toward condenser 14 and three-way valve 43 is open toward expansion device 16. All three shutoff valves 40, 46 and 50 are closed. In this embodiment, working fluid flows through the working fluid circuit 20, to provide maximum sensible cooling to air passing through evaporator 18. In this mode of operation, working fluid is not actively circulated through reheat coil 32.

Figure 2:
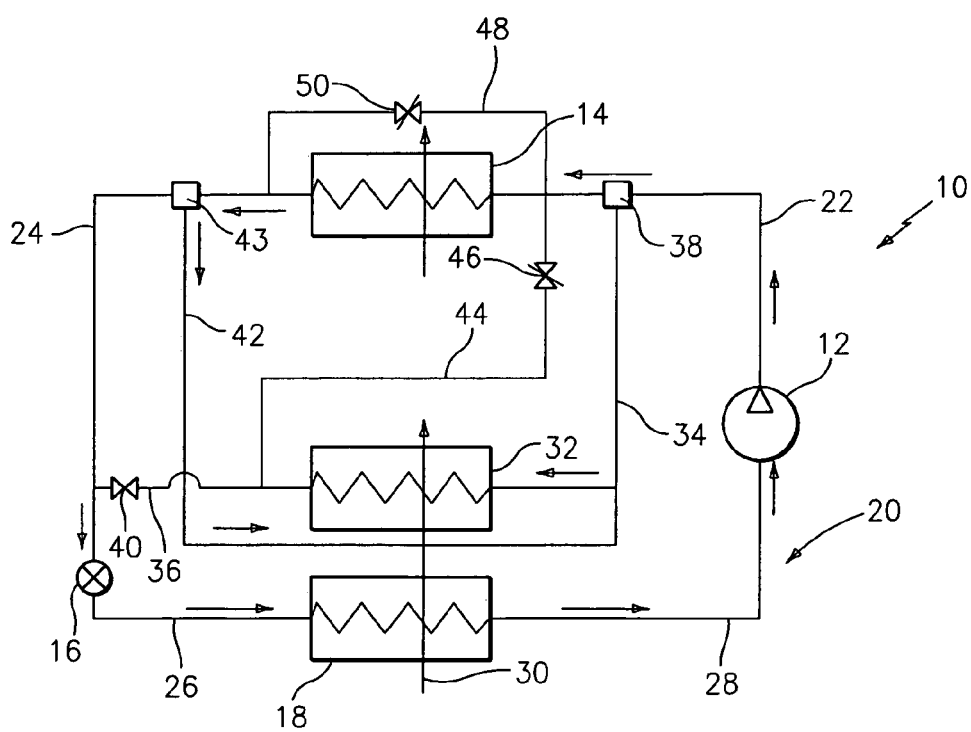
FIG. 2 illustrates a system according to the invention in a mode of operation for providing cooling and dehumidification.

FIG. 2 illustrates a mode of operation wherein both cooling and enhanced dehumidification are provided. This may be desirable in instances wherein cooling is needed, but the system can handle the extra demands of dehumidification as well. In this mode of operation, three-way valve 38 is open toward condenser 14 and three-way valve 43 is open toward reheat coil 32. Shutoff valve 40 is open, and valves 46 and 50 are closed. In this configuration, the entire refrigerant flow is routed from the condenser to the reheat coil 32 as a warm liquid, and from reheat coil 32 to expansion device 16 and through the rest of the circuit as shown by the arrows in FIG. 2. This mode of operation allows extra refrigerant subcooling and enhanced dehumidification of the air stream 30 passing through the evaporator 18, followed by some reheat of the air stream as is known in the art.

Figure 3:
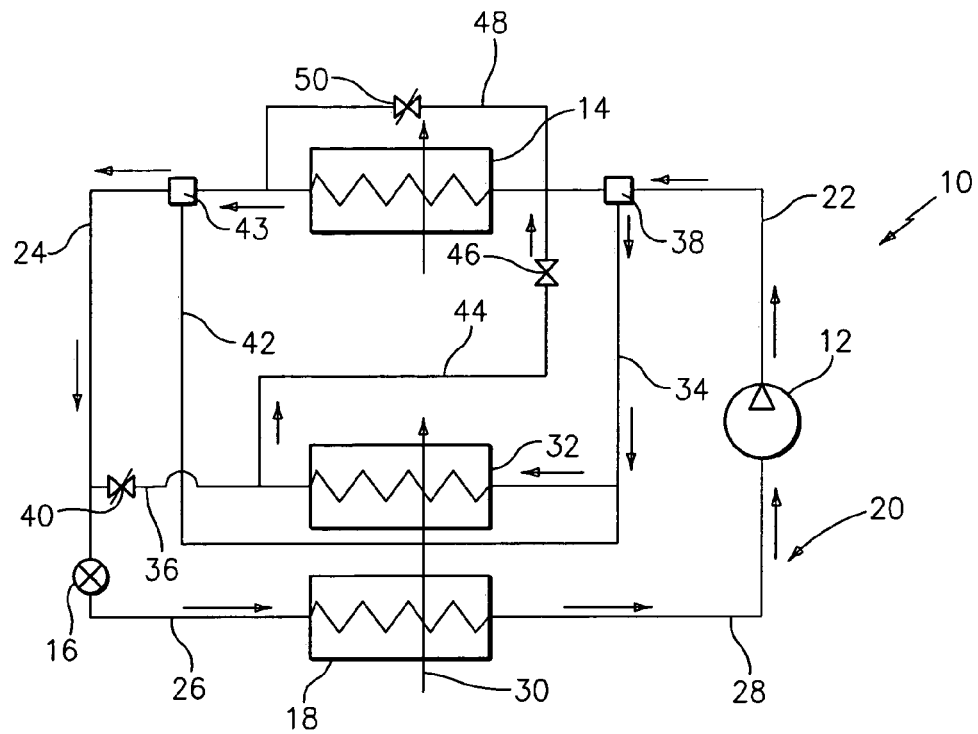
FIG. 3 illustrates a system according to the invention in a mode of operation for providing dehumidification with insignificant sensible capacity.

FIG. 3 illustrates the system configured to operate in a dehumidification mode with usually insignificant sensible capacity. In this mode of operation, three-way valve 38 is open toward reheat coil 32 while three-way valve 43 is open toward expansion device 16. Shutoff valve 46 is open, while valves 40 and 50 are closed. In this mode of operation, hot gas from compressor 12 is passed to the reheat coil 32 before being fed to condenser 14 and, in this way, dehumidification can be accomplished with minimal overall sensible capacity or cooling of the stream of air 30.

Figure 4:
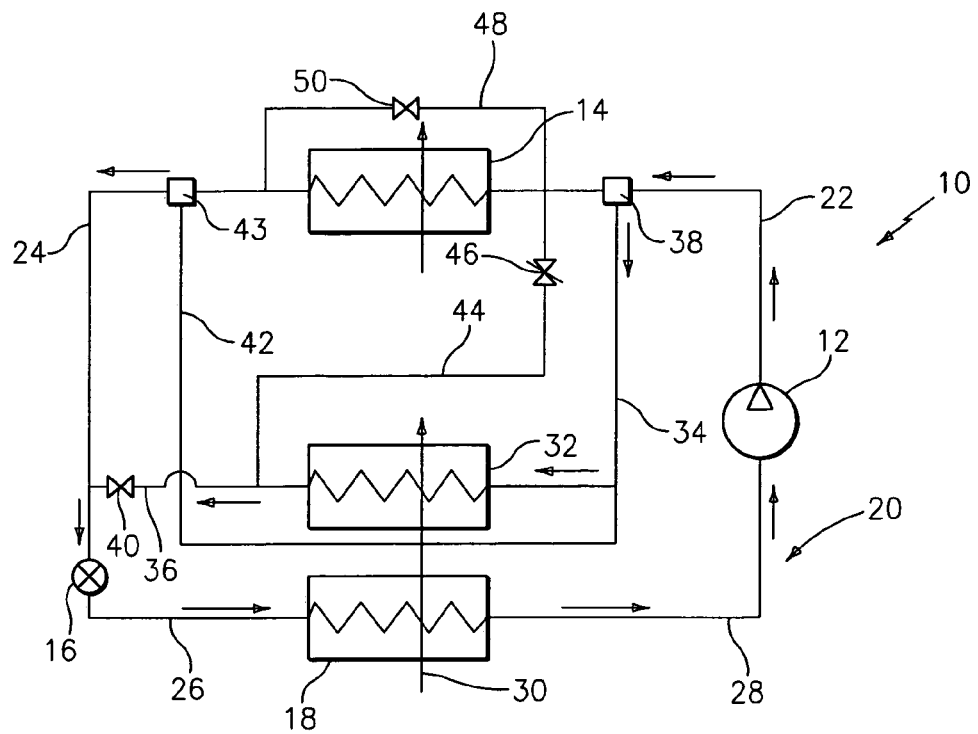
FIG. 4 illustrates a system according to the invention in a mode of operation for providing heating and dehumidification.

FIG. 4 illustrates a mode of operation wherein heating and dehumidification are provided. In this mode of operation, three-way valve 38 is open toward reheat coil 32 and three-way valve 43 is open toward expansion device 16. Shutoff valve 40 is open, while valve 46 is preferably closed. The position of valve 50 in this mode is not critical. In this mode of operation, hot gas from compressor 12 is fed first to reheat coil 32, and then to expansion device 16 and back to evaporator 18 so as to provide both heating and dehumidification of the stream of air 30.

Figure 5:
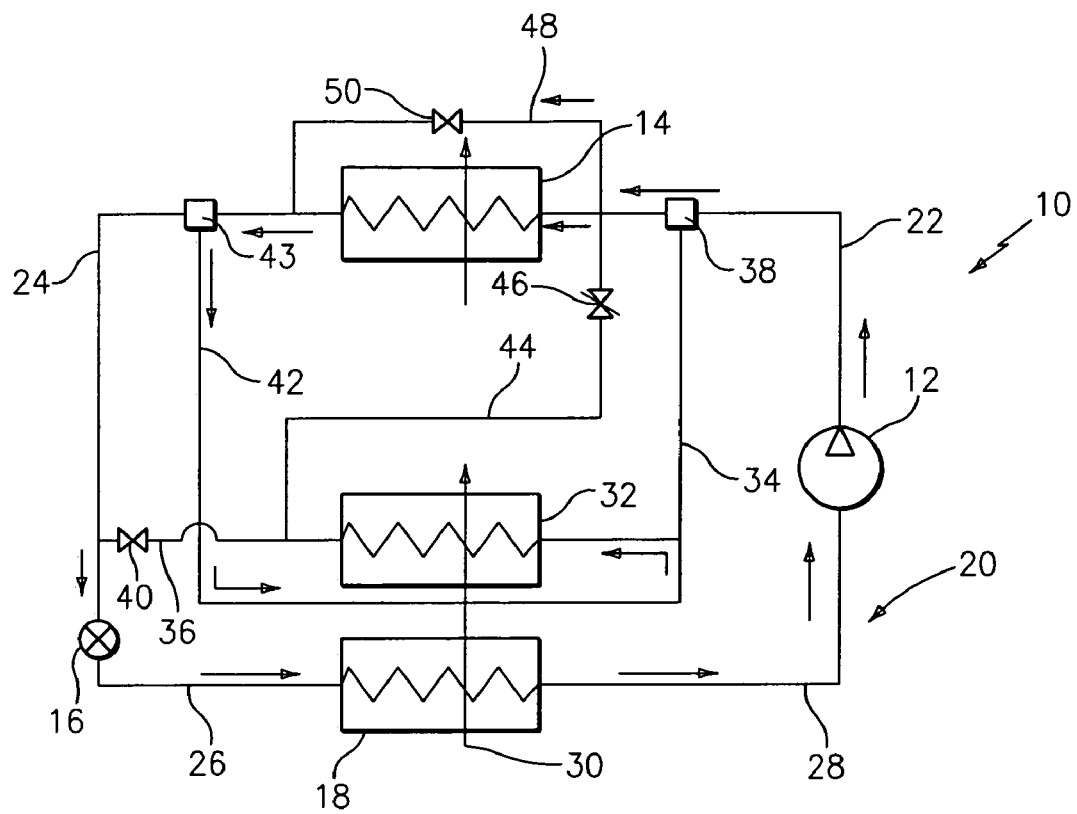
FIG. 5 illustrates a system according to the present invention in a mode of operation for providing dehumidification and variable sensible capacity.

FIG. 5 shows a mode of operation wherein dehumidification with variable sensible capacity is provided. In this mode of operation, three-way valve 38 is directed toward condenser 14, while three-way valve 43 is directed toward the reheat coil 32. Shutoff valves 40 and 50 are open, and valve 46 is closed. In this embodiment, a first portion of hot gas from compressor 12, is passed through condenser 14 while a second portion is allowed to bypass or flow around condenser 14 through line 48 resulting in a two phase mixture being fed to reheat coil 32 to be subcooled and then fed to expansion device 16. Depending upon the portion of flow passed through line 48, variable capacity can be provided. The valve 50 can be utilized as a flow control device, if desired.

In further accordance with the invention, a control unit 51 (FIG. 1) is provided and communicated with each of the valves described herein, and also with sensors for various environmental parameter measurements, and input receiving capability to allow user programming for example of desired temperature, humidity, enthalpy and the like. These communications are schematically illustrated by arrow 53. The actual components of such a control mechanism including sensors, valve controllers, processor units and programming techniques, are well known to a person of ordinary skill in the art. In accordance with the invention, such control system is advantageously adapted to detect what type of mode of operation is called for based upon user input such as desired temperature, humidity and/or enthalpy and environmental factors such as indoor temperature, outdoor temperature, humidity, suction pressure, discharge pressure, saturated suction temperature, saturated discharge temperature, return air temperature, supply air temperature, supply air enthalpy, return air enthalpy, and combinations, and is further adapted to send appropriate signals to these valves so as to open/close same and provide the desired mode of operation.

It should be appreciated that the valves described herein can be substituted with other types of flow control devices, and that the main function of the valves is the ability to control flow as described herein. For example, instead of three-way valves, a pair of solenoid valves can be used to provide the same function. Pairs and/or triplets of shutoff valves can be replaced with three-way or four-way valves accordingly, all within the scope of the present invention.

Instead of shutoff valves and the two-position three-way valves described herein, regulating devices can be used so as to allow gradual changes in refrigerant flow which can be utilized by the control system to optimize system performance.

It should be apparent that lines 48 and 44 containing valves 50 and 46 respectively can be repositioned one relative to the other as is known to a person skilled in the art. It should also be understood that a bleed circuit and/or the hot gas bypass circuit can be added to the schematic to prevent charge migration and evaporator freezing respectively.

Figure 6:
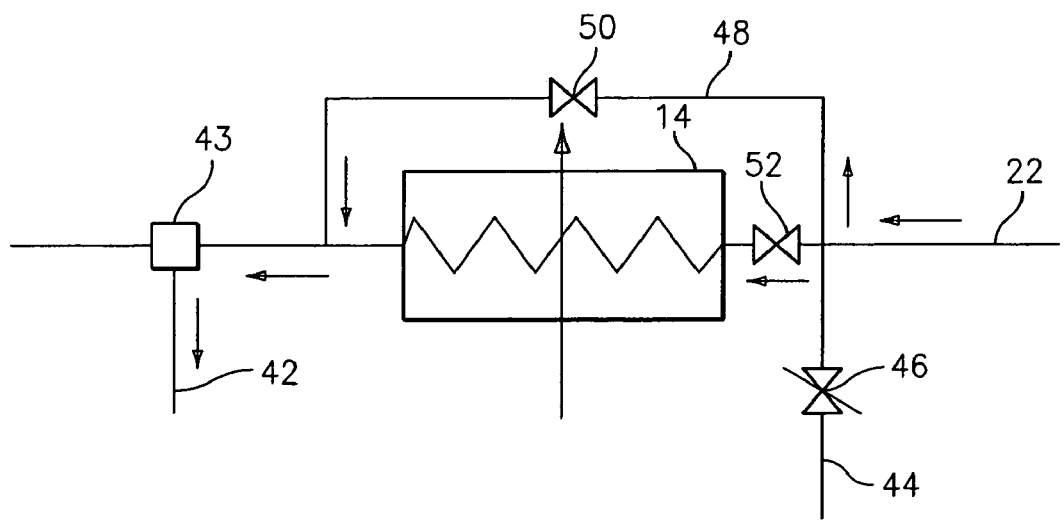
FIG. 6 illustrates an alternative valve configuration for providing operation in accordance with the invention.

It should also be appreciated that although FIGS. 1–5 herein show a specific configuration of circuit and segments for carrying working fluid, these flow lines and segments can be configured differently while performing the same function, and such modifications are well within the scope of the present invention. For example, FIG. 6 illustrates a modification to the system shown in FIGS. 1–5 wherein a valve 52 has been positioned upstream of condenser 14. This valve 52 can be used to control the amount of flow between condenser 14 and bypass line 48 and thereby provides an alternative approach to the variable sensible capacity provided by the FIG. 5 mode of operation. Further, closing valve 52 altogether while opening valves 40 and 50, closing valve 46 and directing valve 43 toward reheat coil 32 provides an alternative approach to bypass condenser 14 completely and provide function as in the FIG. 4 mode of operation, for heating with positive dehumidification. With valve 52, it may be possible to remove valve 38 altogether and still provide the desired modes of operation.

Based upon the foregoing, it should be appreciated that many alternative configurations of lines and types of placement of valves can be used to provide the desired functioned modes, and such alternative configurations are well within the broad scope of the present invention.

It is apparent that there has been provided in accordance with the present invention a hybrid dehumidification system wherein enhanced operation is provided through multiple modes of operation. This fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed:

1. A hybrid dehumidification system, comprising:
   a compressor, a condenser, an expansion device and an evaporator connected for flow of working fluid through a circuit;
   a reheat coil positioned relative to the evaporator for heating at least a portion of a stream of air passing through the evaporator;
   a condenser bypass circuit connected between the working fluid circuit upstream of the condenser and the working fluid circuit downstream of the condenser; and
   working fluid directing means for flowing working fluid in at least two modes of operation selected from a group of modes consisting of:
   a cooling mode wherein working fluid flows sequentially from the compressor to the condenser, from the condenser to the expansion device, from the expansion device to the evaporator and from the evaporator to the compressor;
   a cooling and enhanced dehumidification mode wherein working fluid flows sequentially from the compressor to the condenser, from the condenser to the reheat coil, from the reheat coil to the expansion device, from the expansion device to the evaporator and from the evaporator to the compressor;
   a dehumidification without substantial sensible capacity mode wherein working fluid flows sequentially from the compressor to the reheat coil, from the reheat coil to the condenser, from the condenser to the expansion device, from the expansion device to the evaporator and from the evaporator to the compressor;
   a heating and dehumidification mode wherein working fluid flows sequentially from the compressor to the reheat coil, from the reheat coil to the expansion device, from the expansion device to the evaporator and from the evaporator to the compressor; and
   a dehumidification with variable sensible capacity mode wherein working fluid flows sequentially from the compressor in a first portion to the condenser and in a second portion through the condenser bypass circuit around the condenser, the first and second portions then flow to the reheat coil, from the reheat coil to the expansion device, from the expansion device to the evaporator and from the evaporator to the compressor.

2. A hybrid dehumidification system, comprising:
   a compressor, a condenser, an expansion device and an evaporator connected for flow of working fluid through a circuit;
   a reheat coil positioned relative to the evaporator for heating at least a portion of a stream of air passing through the evaporator; and
   working fluid directing means for flowing working fluid in at least two modes of operation selected from a group of modes consisting of:
   a cooling mode wherein working fluid flows sequentially from the compressor to the condenser, from the condenser to the expansion device, from the expansion device to the evaporator and from the evaporator to the compressor;
   a cooling and enhanced dehumidification mode wherein working fluid flows sequentially from the compressor to the condenser, from the condenser to the reheat coil, from the reheat coil to the expansion device, from the expansion device to the evaporator and from the evaporator to the compressor;
   a dehumidification without substantial sensible capacity mode wherein working fluid flows sequentially from the compressor to the reheat coil, from the reheat coil to the condenser, from the condenser to the expansion device, from the expansion device to the evaporator and from the evaporator to the compressor;
   a heating and dehumidification mode wherein working fluid flows sequentially from the compressor to the reheat coil, from the reheat coil to the expansion device, from the expansion device to the evaporator and from the evaporator to the compressor; and
   a dehumidification with variable sensible capacity mode wherein working fluid flows sequentially from the compressor in a first portion to the condenser and in a second portion around the condenser, the first and second portions then flow to the reheat coil, from the reheat coil to the expansion device, from the expansion device to the evaporator and from the evaporator to the compressor, wherein the working fluid directing means comprises means for selectively flowing working fluid in all of the modes of operation.

3. A hybrid dehumidification system, comprising:

a compressor, a condenser, an expansion device and an evaporator connected for flow of working fluid through a circuit;

a reheat coil positioned relative to the evaporator for heating at least a portion of a stream of air passing through the evaporator; and working fluid directing means for flowing working fluid in at least two modes of operation selected from a group of modes consisting of:

a cooling mode wherein working fluid flows sequentially from the compressor to the condenser, from the condenser to the expansion device, from the expansion device to the evaporator and from the evaporator to the compressor;

a cooling and enhanced dehumidification mode wherein working fluid flows sequentially from the compressor to the condenser, from the condenser to the reheat coil, from the reheat coil to the expansion device, from the expansion device to the evaporator and from the evaporator to the compressor;

a dehumidification without substantial sensible capacity mode wherein working fluid flows sequentially from the compressor to the reheat coil, from the reheat coil to the condenser, from the condenser to the expansion device, from the expansion device to the evaporator and from the evaporator to the compressor;

a heating and dehumidification mode wherein working fluid flows sequentially from the compressor to the reheat coil, from the reheat coil to the expansion device, from the expansion device to the evaporator and from the evaporator to the compressor; and a dehumidification with variable sensible capacity mode wherein working fluid flows sequentially from the compressor in a first portion to the condenser and in a second portion around the condenser, the first and second portions then flow to the reheat coil, from the reheat coil to the expansion device, from the expansion device to the evaporator and from the evaporator to the compressor, wherein the working fluid directing means comprises:

a reheat coil segment connected between the working fluid circuit upstream of the condenser and the reheat coil, and between the reheat coil and the working fluid circuit downstream of the condenser and upstream of the expansion device;

a warm liquid reheat segment connected between the working fluid circuit downstream of the condenser and the reheat coil;

a reheat working fluid recycling segment connected between the reheat coil and the working fluid circuit upstream of the condenser; and a condenser bypass circuit connected between the working fluid circuit upstream of the condenser and the working fluid circuit downstream of the condenser.

4. The system of claim 3, further comprising a first three-way valve positioned between the working fluid circuit and the reheat segment, a second three-way valve positioned between the working fluid circuit and the reheat working fluid recycle segment, and shutoff valves positioned in the reheat working fluid recycle segment, the reheat segment and the condenser bypass segment.

5. The system of claim 4, wherein at least one of the first and second three-way valves and the shutoff valves is a regulating valve.

6. The system of claim 4, further comprising a control member adapted to operate the first and second three-way valves and the shutoff valves based upon operating demands on the system.

7. A method for operating a hybrid dehumidification system, comprising the steps of:

providing a refrigeration system comprising a compressor, a condenser, an expansion device and an evaporator connected for flow of working fluid through a circuit; a reheat coil positioned relative to the evaporator for heating at least a portion of a stream of air passing through the evaporator; and working fluid directing means for selectively flowing working fluid in each of a group of modes of operation comprising:

a cooling mode wherein working fluid flows sequentially from the compressor to the condenser, from the condenser to the expansion device, from the expansion device to the evaporator and from the evaporator to the compressor;

a cooling and enhanced dehumidification mode wherein working fluid flows sequentially from the compressor to the condenser, from the condenser to the reheat coil, from the reheat coil to the expansion device, from the expansion device to the evaporator and from the evaporator to the compressor;

a dehumidification without substantial sensible capacity mode wherein working fluid flows sequentially from the compressor to the reheat coil, from the reheat coil to the condenser, from the condenser to the expansion device, from the expansion device to the evaporator and from the evaporator to the compressor;

a heating and dehumidification mode wherein working fluid flows sequentially from the compressor to the reheat coil, from the reheat coil to the expansion device, from the expansion device to the evaporator and from the evaporator to the compressor; and a dehumidification with variable sensible capacity mode wherein working fluid flows sequentially from the compressor in a first portion to the condenser and in a second portion around the condenser, the first and second portions then flow to the reheat coil, from the reheat coil to the expansion device, from the expansion device to the evaporator and from the evaporator to the compressor;

sensing a desired mode of operation from the group of modes; and operating the working fluid directing means to provide the desired mode of operation.

8. The method of claim 7, wherein the sensing step comprises sensing at least one value selected from the group consisting of indoor temperature, outdoor temperature, humidity, suction pressure, discharge pressure, saturated suction temperature, saturated discharge temperature, return air temperature, supply air temperature, supply air enthalpy and return air enthalpy, and combinations thereof, and using said at least one value to determine said desired mode of operation.

* * * * *